(12) United States Patent
Zha et al.

(10) Patent No.: US 11,746,231 B2
(45) Date of Patent: Sep. 5, 2023

(54) TRANSPARENT STATIC-DISSIPATIVE POLYCARBONATE RESIN COMPOSITION AND PREPARATION METHOD THEREOF

(71) Applicants: SHANGHAI KUMHOSUNNY PLASTICS CO., LTD., Shanghai (CN); SHANGHAI KUMHOSUNNY (JINSHAN) PLASTICS CO., LTD., Shanghai (CN)

(72) Inventors: Chao Zha, Shanghai (CN); Ting Zhou, Shanghai (CN); Minqi Xin, Shanghai (CN)

(73) Assignees: SHANGHAI KUMHOSUNNY PLASTICS CO., LTD., Shanghai (CN); SHANGHAI KUMHOSUNNY (JINSHAN) PLASTICS CO., LTD., Shanghai (CN)

( * ) Notice: Subject to any disclaimer, the term of this patent is extended or adjusted under 35 U.S.C. 154(b) by 218 days.

(21) Appl. No.: 17/417,371

(22) PCT Filed: Jan. 22, 2021

(86) PCT No.: PCT/CN2021/073272
§ 371 (c)(1),
(2) Date: Jun. 22, 2021

(87) PCT Pub. No.: WO2021/218246
PCT Pub. Date: Nov. 4, 2021

(65) Prior Publication Data
US 2022/0325097 A1    Oct. 13, 2022

(30) Foreign Application Priority Data

Apr. 30, 2020 (CN) .......................... 202010367711.8

(51) Int. Cl.
| | | |
|---|---|---|
| *C08L 69/00* | (2006.01) | |
| *C08L 77/00* | (2006.01) | |
| *C08J 3/22* | (2006.01) | |
| *C08K 3/32* | (2006.01) | |

(52) U.S. Cl.
CPC .............. *C08L 69/00* (2013.01); *C08J 3/226* (2013.01); *C08J 2369/00* (2013.01); *C08J 2477/00* (2013.01); *C08K 2003/324* (2013.01); *C08L 2201/04* (2013.01); *C08L 2201/10* (2013.01); *C08L 2205/035* (2013.01)

(58) Field of Classification Search
None
See application file for complete search history.

(56) References Cited

U.S. PATENT DOCUMENTS

2006/0281860 A1* 12/2006 Higuchi ................... C08J 5/00
                                                                 525/89
2007/0100021 A1    5/2007 Glasgow et al.

FOREIGN PATENT DOCUMENTS

| CN | 104292787 | * | 1/2015 |
|---|---|---|---|
| CN | 101845212 B | | 5/2015 |
| CN | 104693745 | * | 6/2015 |
| CN | 104693745 A | | 6/2015 |
| CN | 105153670 A | | 12/2015 |
| CN | 105175924 A | | 12/2015 |
| CN | 106751676 A | | 5/2017 |
| CN | 107163537 B | | 5/2019 |
| CN | 110452514 A | | 11/2019 |
| CN | 111500044 A | | 8/2020 |
| JP | 2005002230 A | | 1/2005 |
| JP | 2005187658 A | | 7/2005 |
| JP | 2016166332 | * | 9/2016 |

OTHER PUBLICATIONS

GB/T 2410-2008, Determination of the luminous transmittance and haze of transparent plastics, 2008, pp. 1-7, The Standardization Administration of the People's Republic of China.

* cited by examiner

*Primary Examiner* — David J Buttner
(74) *Attorney, Agent, or Firm* — Bayramoglu Law Offices LLC

(57) ABSTRACT

A transparent static-dissipative polycarbonate (PC) resin composition includes the following components: 70-95 parts by weight of PC resin, 5-30 parts by weight of antistatic agent masterbatch and 0.5-1.5 parts by weight of a transesterification inhibitor. The antistatic agent masterbatch includes the following components by mass percentage: 40-60% of an antistatic agent, 0.5-1.6% of a transesterification accelerator, 1-3% of an assistant cross-linkinger, and the balance of PC resin. A method for preparing the transparent static-dissipative PC resin composition includes the following steps: (I) preparing the components of the transparent static-dissipative PC resin composition according to the formulation, and mixing the components evenly to obtain a premix; and (II) adding the premix into a twin-screw extruder, melting, extruding, cooling and pelletizing, to obtain a target product.

9 Claims, No Drawings

TRANSPARENT STATIC-DISSIPATIVE POLYCARBONATE RESIN COMPOSITION AND PREPARATION METHOD THEREOF

CROSS REFERENCE TO THE RELATED APPLICATIONS

This application is the national phase entry of International Application No. PCT/CN2021/073272, filed on Jan. 22, 2021, which is based upon and claims priority to Chinese Patent Application No. 202010367711.8, filed on Apr. 30, 2020, the entire contents of which are incorporated herein by reference.

TECHNICAL FIELD

The present disclosure relates to a polycarbonate (PC) resin composition and a preparation method thereof, in particular to a transparent static-dissipative PC resin composition and a preparation method thereof.

BACKGROUND

Static-dissipative materials refer to materials with a surface resistivity of $10^6$-$10^{12}$ ohms. Materials with a surface resistivity of $10^{10}$-$10^{12}$ ohms can prevent the local accumulation of static electricity, and are mainly used in the shells of household appliances and electronic products to avoid electrostatically collected dust thereon. Materials with a surface resistivity of $10^6$-$10^9$ ohms can quickly dissipate static electricity, and are mainly used for preventing semiconductor failure caused by electrostatic discharge, and applied in explosion-proof, fire-proof and other scenarios. It is desirable to use highly transparent static-dissipative materials in some applications, such as semiconductor boxes and integrated casing of vacuum cleaners.

At present, the organic macromolecular antistatic agent with a refractive index of 1.49 on the market can be mixed with poly(methyl methacrylate) (PMMA) to prepare an antistatic transparent material. In addition, a resin composition with the same refractive index as the antistatic agent can be prepared through the compounding of a matrix, and then mixed with the corresponding antistatic agent to obtain a transparent product.

Polycarbonate (PC) has become an irreplaceable material due to its excellent transparency, toughness and heat resistance. When the transparent PC is used in occasions that require the static-dissipative performance, the PC's surface is typically coated with a transparent antistatic coating in the industry. However, the antistatic coating on the surface of the product obtained is easily rubbed or washed away, so the static-dissipative performance is often short-lived while the cost is high.

PC can be compounded with an organic macromolecular antistatic agent to obtain a PC product with static-dissipative performance, but such product has three major technical problems:

(1) The refractive index of the organic macromolecular antistatic agent, namely a poly(ether-block-amide) copolymer, is generally 1.48-1.52, while the refractive index of PC is 1.58. It is hard to obtain a transparent product by simply blending the two materials with inconsistent refractive indexes.

(2) PC can be mixed with a resin (such as PMMA) that has a refractive index lower than PC to obtain a transparent antistatic PC/PMMA having a refractive index identical to that of the antistatic agent by adjusting the ratio of PC to PMMA. The premise is to solve the incompatibility between PC and PMMA. However, the heat resistance and impact resistance of the PC are greatly reduced, limiting the application of the product.

(3) The refractive indexes of the organic macromolecular antistatic agent and other polymer change inconsistently with temperature. Consequently, the product may have excellent transparency at room temperature or a certain temperature, but the transparency may be greatly reduced when the temperature is increased or decreased.

CN101845212B discloses a transparent antistatic PC resin film, where PC is mixed with a macromolecular antistatic agent to obtain a 1-mm thick antistatic PC resin film with a transmittance of over 88%. Such a high transmittance is possible only because the product has a relatively small thickness. In addition, the problem of the transparency changing at different temperatures is not solved yet.

CN107163537B and CN110452514A disclose a method for preparing transparent antistatic PC, where PC is mixed with a micromolecular antistatic agent (ionic liquid) to obtain a material with $10^{10}$-$10^{12}$ ohms. The micromolecular antistatic agent, however, is easily precipitated and further leads to antistatic failure. Therefore, the prepared transparent antistatic PC has a short service life.

SUMMARY

In order to overcome the disadvantages of poor static-dissipative performance and temperature-affected transparency in the prior art, the present disclosure provides a transparent static-dissipative polycarbonate (PC) resin composition and a preparation method thereof.

The objective of the present disclosure can be achieved by the following technical solutions:

A transparent static-dissipative PC resin composition includes the following components:
70-95 parts by weight of PC resin;
5-30 parts by weight of antistatic agent masterbatch; and
0.5-1.5 parts by weight of a transesterification inhibitor.

The antistatic agent masterbatch includes the following components by mass percentage:
40-60% of an antistatic agent;
0.5-1.6% of a transesterification accelerator;
1-3% of an assistant cross-linkinger; and
the balance of PC resin.

The antistatic agent is an organic macromolecular antistatic agent which is a poly(ether-block-amide) copolymer.

The transesterification accelerator is one or more of the group consisting of tetrabutyl titanate, p-toluene sulfonic acid and stannous octoate.

The assistant cross-linkinger is one or more selected from the group consisting of styrene-acrylonitrile grafted maleic anhydride resin, acrylonitrile-butadiene-styrene grafted maleic anhydride resin, styrene-acrylonitrile grafted glycidyl methacrylate resin, acrylonitrile-butadiene-styrene grafted glycidyl methacrylate and polystyrene grafted maleic anhydride resin.

In the transparent static-dissipative PC resin composition, the antistatic agent accounts for 3-12% by mass fraction.

A method for preparing the antistatic agent masterbatch includes the following steps:

(1) preparing the components of the antistatic agent masterbatch according to the formulation, and mixing the components evenly to obtain a premix; and (2) adding the premix into a twin-screw extruder, melting, extruding, cooling and pelletizing, to obtain the antistatic agent masterbatch, where the extruding by the twin-screw extruder is conducted at 250-280° C. and at a screw speed of 200-500 rpm.

The transesterification inhibitor is one or more selected from the group consisting of ethyl orthosilicate, triphenyl phosphite, sodium dihydrogen phosphate and diisooctyl phosphate.

The present disclosure further provides a method for preparing the transparent static-dissipative PC resin composition, including the following steps:

(I) preparing the components of the transparent static-dissipative PC resin composition according to the formulation, and mixing the components evenly to obtain a premix; and (II) adding the premix into a twin-screw extruder, melting, extruding, cooling and pelletizing, to obtain a target product.

The extruding by the twin-screw extruder is conducted at 240-260° C. and at a screw speed of 200-500 rpm.

Compared with the prior art, the present disclosure has the following advantages:

(1) The transparent static-dissipative PC resin composition obtained by the present disclosure has excellent static-dissipative performance and transparency, with a surface resistivity reaching $10^7$-$10^{10}$ ohms. It has excellent transparency, toughness and heat resistance like PC, with a transmittance of over 85%. In addition, its transparency will not change with temperature.

(2) The present disclosure obtains the transparent product by improving the compatibility of the antistatic agent and the PC. The PC is mixed with the organic macromolecular antistatic agent, the transesterification accelerator and the cross-linking accelerator. As a result, the PC and the PA segment in the antistatic agent undergo a transesterification reaction, and at the same time, the PC and the PA react under the action of the assistant cross-linkinger to cause micro-crosslinking to obtain the antistatic agent masterbatch, i.e., a block copolymer of polyether and PA/PC. This effectively improves the compatibility of the antistatic agent and the PC resin. The antistatic agent is blended with the PC. As the compatibility is significantly improved, the size of the dispersed phase of the antistatic agent is significantly reduced. When the size of the dispersed phase is less than half the wavelength of visible light, the blend achieves optimal transparency.

(3) The present disclosure greatly reduces the amount of the antistatic agent and effectively improves the conductivity. The organic macromolecular antistatic agent conventionally accounts for more than 10% in an antistatic product, and the product's resistivity is generally more than $10^9$ ohms. In contrast, the lowest amount of the antistatic agent in the present disclosure is only 3%. This is because the size of the dispersed phase of the antistatic agent is significantly reduced, the aspect ratio is increased, and the conductive path is more easily formed.

(4) The transparency of the static-dissipative PC material obtained by the present disclosure remains unchanged at different temperatures. For a conventional antistatic product, the size of the macromolecular antistatic agent in the matrix resin is 3-800 µm. When the temperature changes, the refractive indexes of the matrix resin and the antistatic agent change differently, resulting in an obvious change in the transparency of the material. However, the transparent static-dissipative PC resin composition obtained by the present disclosure has an unchanged transparency even if the refractive indexes of the PC and the antistatic agent deviate largely at different temperatures since the size of the dispersed phase of the antistatic agent is smaller than the wavelength of visible light. This feature is very suitable for static-dissipative products that work under changing temperatures.

DETAILED DESCRIPTION OF THE EMBODIMENTS

The present disclosure is described in detail below with reference to specific examples. The following examples will help those skilled in the art to further understand the present disclosure, but do not limit the present disclosure in any way. It should be noted that those of ordinary skill in the art can further make several variations and improvements without departing from the concept of the present disclosure. These all fall within the protection scope of the present disclosure.

The present disclosure provides a transparent static-dissipative polycarbonate (PC) resin composition and a preparation method thereof. The transparent static-dissipative PC resin composition was prepared in two steps:

(1) Preparation of Antistatic Agent Masterbatch (1-1) Components of the antistatic agent masterbatch by mass percentage, i.e., 40-60% of an antistatic agent, 0.5-1.6% of a transesterification accelerator, 1-3% of an assistant cross-linkinger and the balance of PC resin, were prepared; and the components were mixed evenly to obtain a premix.

(1-2) The premix was added into a twin-screw extruder, followed by melting, extruding, cooling and pelletizing to obtain the antistatic agent masterbatch, where the extruding by the twin-screw extruder was conducted at 250-280° C. and at a screw speed of 200-500 rpm.

(2) Preparation of a Transparent Static-Dissipative PC Resin Composition (2-1) Components of the transparent static-dissipative PC resin composition, i.e., 70-95 parts by weight of PC resin, 5-30 parts by weight of the antistatic agent masterbatch and 0.5-1.5 parts by weight of a transesterification inhibitor, were prepared; and the components were mixed evenly to obtain a premix.

(2-2) The premix was added into a twin-screw extruder, followed by melting, extruding, cooling and pelletizing to obtain a target product, where the extruding by the twin-screw extruder was conducted at 240-260° C. and at a screw speed of 200-500 rpm; in the obtained transparent static-dissipative PC resin composition, the organic macromolecular antistatic agent accounts for 3-12% by mass fraction.

The components used in the examples are described below:

The antistatic agent is an organic macromolecular antistatic agent which is a poly(ether-block-amide) copolymer. The antistatic agent is readily available on the market, which, used in the examples, includes MH1657 commercially available from Arkema and Ionphase U1 from Ionphase.

The transesterification accelerator may be tetrabutyl titanate, p-toluene sulfonic acid or stannous octoate.

The assistant cross-linkinger may be styrene-acrylonitrile grafted maleic anhydride resin, acrylonitrile-butadiene-styrene grafted maleic anhydride resin, styrene-acrylonitrile grafted glycidyl methacrylate resin, acrylonitrile-butadiene-styrene grafted glycidyl methacrylate or polystyrene grafted maleic anhydride resin.

The transesterification inhibitor may be ethyl orthosilicate, triphenyl phosphite, sodium dihydrogen phosphate or diisooctyl phosphate.

Under the condition that additives do not adversely affect the transparency and static-dissipative performance of the PC resin composition, the disclosed composition may further optionally include one or more additives that are conventionally used in the manufacture of resin compositions. For example, the disclosed resin composition may include one or more of other resins, stabilizers, flame retardants, impact modifiers, colorants and mold release agents.

The following is the specific implementation process of the present disclosure, in which the information of the antistatic agent involved in each example and comparative example is as follows:

Antistatic agent AS-1: Arkema MH1657, surface resistivity $10^9$

Antistatic agent AS-2: Ionphase U1, surface resistivity $10^7$

Transesterification accelerator ZJH-1: tetrabutyl titanate, commercially available Transesterification accelerator ZJH-2: p-toluene sulfonic acid, commercially available Transesterification accelerator ZJH-3: stannous octoate, commercially available Assistant cross-linkinger ZJL-1: styrene-acrylonitrile grafted maleic anhydride resin, commercially available Assistant cross-linkinger ZJL-2: Styrene-acrylonitrile grafted glycidyl methacrylate resin, commercially available Transesterification inhibitor YZZ-1: ethyl orthosilicate, commercially available Transesterification inhibitor YZZ-3: sodium dihydrogen phosphate, commercially available.

The formulations of the antistatic agent masterbatch in the examples and comparative examples of the present disclosure are shown in Table 1, and the addition amount of each component is expressed in mass fraction.

TABLE 1

| Components of antistatic agent masterbatch | | | | | | | | |
|---|---|---|---|---|---|---|---|---|
| Masterbatch | Masterbatch 1# | Masterbatch 2# | Masterbatch 3# | Masterbatch 4# | Masterbatch 5# | Masterbatch 6# | Masterbatch 7# | Masterbatch 8# |
| PC | 58.5 | 36.6 | 57 | 37.2 | 44.1 | 39.1 | 38.8 | 30 |
| AS-1 | 40 | 60 | | | | 60 | | |
| AS-2 | | | 40 | 60 | 52 | | 60 | 60 |
| ZJH-1 | 0.5 | | | | | | | |
| ZJH-2 | | 0.9 | | 1.6 | 0.3 | 0.9 | | 3 |
| ZJH-3 | | | 0.5 | | 0.8 | | | |
| ZJL-1 | 1.0 | | | 1.2 | 0.3 | | 1.2 | 7 |
| ZJL-2 | | 2.5 | 2.5 | | 2.5 | | | |

The antistatic agent masterbatch 1-8# was prepared as follows:

(1) The components were weighed according to the amounts in parts by weight as described in Table 1, and mixed evenly to obtain a premix.

(2) The premix was added into a twin-screw extruder, followed by melting and extruding at 260° C., cooling and pelletizing.

Examples 1 to 8

Examples 1 to 8 provide transparent static-dissipative PC resin compositions, the formulations of which are shown in Table 2, and the addition amount of each component is expressed in parts by weight.

TABLE 2

| Components of transparent static-dissipative PC resin compositions in Examples 1 to 8 | | | | | | | | |
|---|---|---|---|---|---|---|---|---|
| | Example 1 | Example 2 | Example 3 | Example 4 | Example 5 | Example 6 | Example 7 | Example 8 |
| PC | 92.5 | 70 | 95 | 80 | 80 | 90 | 80 | 87 |
| Masterbatch 1# | 7.5 | 30 | | | | | | |
| Masterbatch 2# | | | 5 | 20 | | | | |
| Masterbatch 3# | | | | | 20 | | | |
| Masterbatch 4# | | | | | | 10 | 20 | |
| Masterbatch 5# | | | | | | | | 13 |

TABLE 2-continued

Components of transparent static-dissipative PC resin compositions in Examples 1 to 8

|  | Example 1 | Example 2 | Example 3 | Example 4 | Example 5 | Example 6 | Example 7 | Example 8 |
|---|---|---|---|---|---|---|---|---|
| YZZ-1 | 0.5 | 1.2 |  |  | 0.7 | 0.6 |  | 0.5 |
| YZZ-2 |  |  | 1.5 | 0.7 |  |  | 0.7 | 0.5 |

Comparative Examples 1 to 8

Comparative Examples 1 to 8 provide transparent static-dissipative PC resin compositions, the formulations of which are shown in Table 3, and the addition amount of each component is expressed in parts by weight.

TABLE 3

Components of transparent static-dissipative PC resin compositions in Comparative Examples 1 to 8

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| PC | 80 | 80 | 60 | 91.4 | 95 | 80 |  | 88 |
| Masterbatch 3# | 20 | 20 | 40 |  |  |  |  |  |
| Masterbatch 6# |  |  |  |  | 5 |  |  |  |
| Masterbatch 7# |  |  |  |  |  | 20 |  |  |
| Masterbatch 8# |  |  |  |  |  |  | 15 |  |
| YZZ-1 |  | 3 | 0.7 | 0.7 | 0.8 | 0.8 | 0.3 |  |
| AS-2 |  |  |  | 8 |  |  |  | 12 |
| ZJH-3 |  |  |  | 0.1 |  |  |  |  |
| ZJL-2 |  |  |  | 0.5 |  |  |  |  |

The resin compositions of Examples 1 to 8 and Comparative Examples 1 to 8 were prepared as follows:

The components of the resin compositions in Examples 1 to 8 and Comparative Examples 1 to 8 were put into a high-speed mixer to be premixed evenly to obtain a premix. The premix was added into a twin-screw extruder, melted and extruded at 250° C. and at a screw speed of 350 rpm, followed by cooling, and pelletizing to obtain a final product.

In Comparative Example 4, the antistatic masterbatch was not prepared separately, but according to the same components of Example 5, the antistatic agent, the transesterification agent, the assistant cross-linkinger, the transesterification inhibitor and the PC resin were extruded in one step. In Comparative Example 8, the PC and the antistatic agent were directly mixed.

The mechanical properties of the resin compositions prepared in Examples 1 to 8 and Comparative Examples 1 to 8 were tested:

Charpy impact strength: Tested in accordance with ISO 179-1:2010 (E) standard, impact energy 4 J.

Flexural modulus: Tested in accordance with ISO 178: 2010 (E) standard, test rate 2 mm/min.

Resistivity: The surface resistivity of a sample was tested in accordance with ASTM D257.

Light transmittance: The light transmittance of a 3-mm thick sample plate was tested in accordance with GB/T 2410-2008 at 23° C. and 80° C. respectively.

The test results of Examples 1 to 8 are shown in Table 4, and the test results of Comparative Examples 1 to 8 are shown in Table 5.

TABLE 4

Mechanical properties, resistivity and light transmittance test results of the Examples

|  | Example 1 | Example 2 | Example 3 | Example 4 | Example 5 | Example 6 | Example 7 | Example 8 |
|---|---|---|---|---|---|---|---|---|
| Charpy impact strength (KJ/m$^2$) | 58 | 43 | 57 | 48 | 59 | 55 | 49 | 53 |
| Flexural modulus (MPa) | 2200 | 1900 | 2280 | 2030 | 2000 | 2180 | 1970 | 2100 |
| Resistivity (ohm) | $10^{10}$ | $10^9$ | $10^{10}$ | $10^9$ | $10^7$ | $10^8$ | $10^7$ | $10^7$ |
| Light transmittance at 23° C. (%) | 89 | 85 | 91 | 88 | 91 | 89 | 86 | 90 |
| Light transmittance at 80° C. (%) | 88 | 85 | 92 | 89 | 90 | 87 | 88 | 89 |

TABLE 5

Mechanical properties, resistivity and light transmittance test results of the Comparative Examples

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Charpy impact strength (KJ/m$^2$) | 12 | 56 | 25 | 55 | 44 | 22 | 12 | 46 |
| Flexural modulus (MPa) | 1910 | 2030 | 1470 | 1980 | 2070 | 1900 | 2300 | 2000 |
| Resistivity (ohm) | $10^8$ | $10^7$ | $10^7$ | $10^{14}$ | $10^{15}$ | $10^{14}$ | $10^{12}$ | $10^9$ |
| Light transmittance at 23° C. (%) | 80 | 63 | 35 | 32 | 69 | 44 | 33 | 11 |
| Light transmittance at 80° C. (%) | 54 | 61 | 36 | 12 | 68 | 14 | 20 | 9 |

In the examples, the antistatic agent masterbatch was prepared first, and then the antistatic agent masterbatch was mixed with other components, that is, the transparent static-dissipative PC resin compositions were prepared in two steps. In Comparative Example 4, a one-step method was adopted, which greatly increases the resistivity and greatly reduces the light transmittance. When the PC resin and the antistatic agent are directly mixed, the light transmittance is only about 10%. The light transmittance at 23° C. and 80° C. in the examples is less different, while the light transmittance at different temperatures in the comparative examples is quite different, indicating that the light transmittance of the compositions of the present disclosure is not affected by temperature.

The specific examples of the present disclosure are described above. It should be understood that the present disclosure is not limited to the above specific implementations, and a person skilled in the art can make various variations or modifications within the scope of the claims without affecting the essence of the present disclosure.

What is claimed is:

1. A transparent static-dissipative polycarbonate (PC) resin composition, comprising the following components:
   70-95 parts by weight of PC resin;
   5-30 parts by weight of antistatic agent masterbatch; and
   0.5-1.5 parts by weight of a transesterification inhibitor;
   wherein the antistatic agent masterbatch comprises the following components by mass percentage:
   40-60% of an antistatic agent;
   0.5-1.6% of a transesterification accelerator;
   1-3% of an assistant cross-linkinger; and
   a balance of PC resin.

2. The transparent static-dissipative PC resin composition according to claim 1, wherein
   the antistatic agent is an organic macromolecular antistatic agent, and
   the organic macromolecular antistatic agent is a poly(ether-block-amide) copolymer.

3. The transparent static-dissipative PC resin composition according to claim 1, wherein
   the transesterification accelerator is at least one selected from the group consisting of tetrabutyl titanate, p-toluene sulfonic acid and stannous octoate.

4. The transparent static-dissipative PC resin composition according to claim 1, wherein
   the assistant cross-linkinger is at least one selected from the group consisting of styrene-acrylonitrile grafted maleic anhydride resin, acrylonitrile-butadiene-styrene grafted maleic anhydride resin, styrene-acrylonitrile grafted glycidyl methacrylate resin, acrylonitrile-butadiene-styrene grafted glycidyl methacrylate and polystyrene grafted maleic anhydride resin.

5. The transparent static-dissipative PC resin composition according to claim 1, wherein
   in the transparent static-dissipative PC resin composition, the antistatic agent accounts for 3-12% by mass fraction.

6. The transparent static-dissipative PC resin composition according to claim 1, wherein
   a method for preparing the antistatic agent masterbatch comprises the following steps:
   (1) preparing the components of the antistatic agent masterbatch according to a formulation, and mixing the components evenly to obtain a premix; and
   (2) adding the premix into a twin-screw extruder, melting and extruding the premix to obtain an extruded product, and cooling and pelletizing the extruded product, to obtain the antistatic agent masterbatch, wherein the premix is extruded by the twin-screw extruder at 250-280° C. and at a screw speed of 200-500 rpm.

7. The transparent static-dissipative PC resin composition according to claim 5, wherein
   the transesterification inhibitor is at least one selected from the group consisting of ethyl orthosilicate, triphenyl phosphite, sodium dihydrogen phosphate and diisooctyl phosphate.

8. A method for preparing the transparent static-dissipative PC resin composition according to claim 1, comprising the following steps:
   (I) preparing the components of the transparent static-dissipative PC resin composition according to a formulation, and mixing the components evenly to obtain a premix; and
   (II) adding the premix into a twin-screw extruder, melting and extruding the premix to obtain an extruded product, and cooling and pelletizing the extruded product, to obtain the transparent static-dissipative PC resin composition.

9. The method according to claim 8, wherein
   the premix is extruded by the twin-screw extruder at 240-260° C. at a screw speed of 200-500 rpm.

* * * * *